A. J. STONE.
Hoe.
No. 215,077. Patented May 6, 1879.
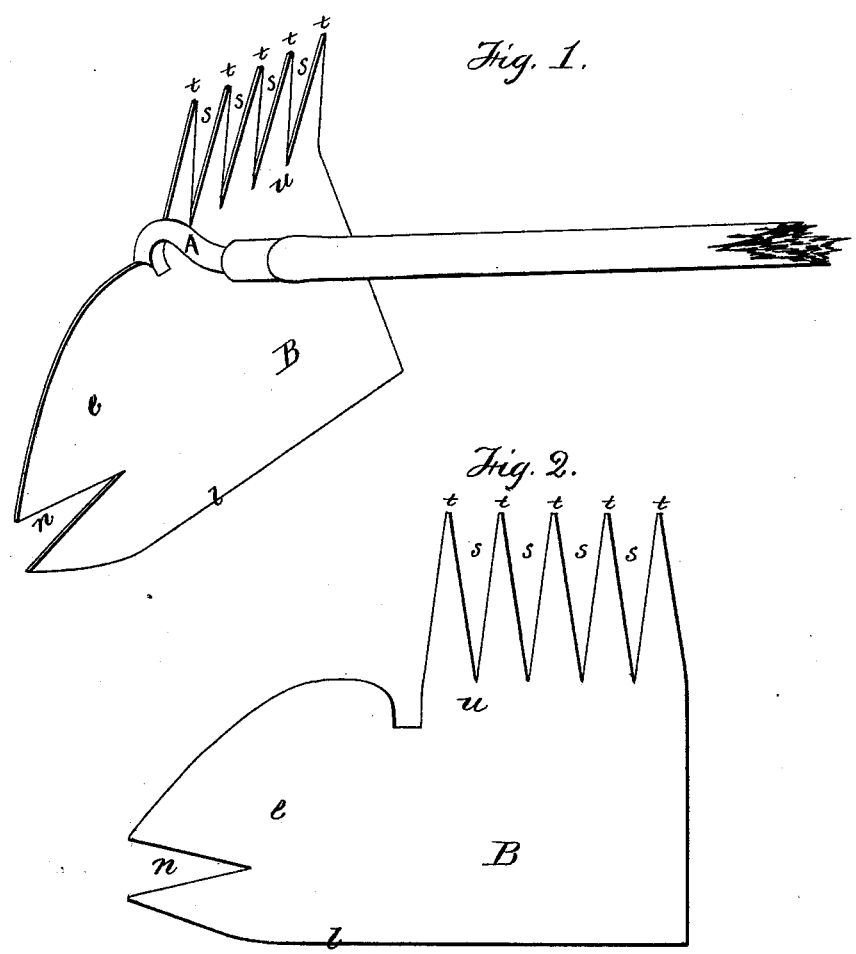
Witnesses.
Geo. Willis Pierce
E. B. Fairchild
Inventor.
A. J. Stone
by Knight & Brown
Attys.

UNITED STATES PATENT OFFICE.

ALANSON J. STONE, OF MILWAUKEE, WISCONSIN.

IMPROVEMENT IN HOES.

Specification forming part of Letters Patent No. 215,077, dated May 6, 1879; application filed September 30, 1878.

*To all whom it may concern:*

Be it known that I, ALANSON J. STONE, of Milwaukee, in the county of Milwaukee and State of Wisconsin, have invented certain Improvements in Hoes, of which the following is a specification.

This invention has for its object to provide an improved hoe, adapted for several purposes in addition to the ordinary use of the hoe; and to this end it consists in the construction which I will now proceed to describe.

Of the accompanying drawings, forming a part of this specification, Figure 1 represents a perspective view of a hoe embodying my invention. Fig. 2 represents a view of the blank from which my improved hoe is formed.

Similar letters of reference indicate like parts in all the figures

In carrying out my invention, I form a flat blank, B, substantially as shown in Fig. 2, the same having a series of V-shaped teeth, $t$, formed on the portion which is to be the upper edge, $u$, of the hoe, and a V-shaped notch, $n$, cut in the portion which is to be one end, $e$, of the hoe. The notch $n$ is preferably located near the lower or cutting edge, $l$, of the hoe, as shown, and the end $e$ of the blank in which the notch is cut is rounded or inclined from the edges $u$ and $l$ to the notch $n$, so that said end is narrowed and caused to terminate in two points, which are formed by the rounded or inclined end and the sides of the notch.

The lower or cutting edge, $l$, is substantially straight, and the end opposite the notched and rounded end $e$ is about at a right angle with said cutting-edge. The blank is of substantially uniform thickness at all parts; consequently all parts of its margin are adapted for use in cutting weeds, &c. The teeth $t$, as before stated, are preferably V-shaped, and are separated by V-shaped spaces $s$.

In adapting the blank for use as a hoe, I provide it with a suitable shank or tang, A, and bend the teeth $t$ backwardly at an obtuse angle with the body of the blank, when, the blank being properly tempered and polished, and provided with a suitable handle, the hoe is completed.

The hoe thus constructed is adapted to be used in the manner of the ordinary hoe, while the notched and pointed end $e$ and the toothed upper edge, $u$, are adapted to the following purposes: First, the pointed shape of the end $e$ adapts it to operate in narrow spaces between plants without disturbing the latter, and to be inserted somewhat deeply into the ground for the purpose of cutting or grasping the roots of weeds below the surface; second, the notch $n$ is adapted to grasp and pull a weed either above or below the surface of the ground, the weed or root becoming wedged between the converging sides of the notch, so that the latter takes a firm hold, which enables a weed to be pulled without being cut off; third, the portion of the hoe having the V-shaped teeth $t$, separated, as described, by V-shaped spaces, becomes, in fact, a notched or serrated cutting-edge, which is adapted to be used in loosening and raking the surface of the ground, and also in cutting or pulling weeds, in the same manner as the notch $n$.

It will be seen that the hoe described is a very convenient utensil, especially adapted for garden use. Its cost will hardly exceed that of the ordinary hoe, while its convenience is much greater.

I am aware that a hoe has been provided on its upper edge with ordinary rake-teeth; but, so far as I am aware, such teeth have never been adapted for cutting and pulling weeds.

I claim—

The implement herein described, consisting of the metal blade having a series of teeth, $t$, on one side, extending a portion of its length, and bent at an obtuse angle with the body of the blade, and having a substantially straight cutting-edge on the opposite side, extending to the point $l$, said blade being also curved or tapered from the points $u$ $l$ to a V-shaped cutting-notch, $n$, at one corner, and provided with a shank for the attachment of a handle, substantially as described, for the purpose specified.

In testimony whereof I have signed my name to this specification in the presence of two subscribing witnesses.

ALANSON J. STONE.

Witnesses:
GEO. WILLIS PIERCE,
C. F. BROWN.